(12) United States Patent
Davis

(10) Patent No.: US 7,675,929 B1
(45) Date of Patent: Mar. 9, 2010

(54) METHOD AND SYSTEM FOR MANAGING DATA FLOW IN A DATA TRANSMISSION SYSTEM

(75) Inventor: Almir Davis, Quincy, MA (US)

(73) Assignee: EMC Corporation, Hopkinton, MA (US)

( * ) Notice: Subject to any disclaimer, the term of this patent is extended or adjusted under 35 U.S.C. 154(b) by 1002 days.

(21) Appl. No.: 11/324,352

(22) Filed: Jan. 3, 2006

(51) Int. Cl.
*H04L 12/56* (2006.01)
(52) U.S. Cl. .................... 370/412; 370/235.1
(58) Field of Classification Search ........... 370/235, 370/235.1, 236, 412, 417; 709/200, 328; 712/220, 225; 710/240
See application file for complete search history.

(56) References Cited

U.S. PATENT DOCUMENTS

| | | | |
|---|---|---|---|
| 6,292,888 B1 * | 9/2001 | Nemirovsky et al. | 712/225 |
| 6,683,884 B1 * | 1/2004 | Howard | 370/412 |
| 6,956,818 B1 | 10/2005 | Thodiyil | |
| 7,263,587 B1 | 8/2007 | Yeh et al. | |
| 7,424,566 B2 | 9/2008 | Manula et al. | |
| 2001/0051972 A1 * | 12/2001 | Eydelman et al. | 709/200 |
| 2002/0144038 A1 * | 10/2002 | Smith | 710/240 |

\* cited by examiner

*Primary Examiner*—Kwang B Yao
*Assistant Examiner*—Andrew Lai
(74) *Attorney, Agent, or Firm*—Krishnendu Gupta; Scott A. Ouellette

(57) ABSTRACT

A data flow management system and method in which an application and its clients are made aware of the available credits for each type of transfer before the transfer is attempted. This enables the clients to transmit packets only when the RX side has issued a sufficient number of credits to insure that the transmission will not be stalled. The invention eliminates the need for FIFO buffers in the PCI-Express core, since the application will not transmit packets to the core until the required number of credits for the particular transfer type is available. Therefore, packet transmissions do not require buffering in the core, as they are only sent when they can be sent all the way through the core to the link. The efficient back-to-back transfer support enabled by this protocol increases the overall throughput and efficiency of the system as transfers through the application interface have fewer gaps therebetween, because the credit management protocol with its back-to-back feature reduces the idle times between packets traversing the application interface. An enhanced Quality of Service feature is also introduced by creating an environment where the low-latency packets can receive a highest attention and the lowest transmission wait time.

21 Claims, 7 Drawing Sheets

METHOD AND SYSTEM FOR MANAGING DATA FLOW IN A DATA TRANSMISSION SYSTEM

FIELD OF THE INVENTION

The present invention is generally directed to a method and system for managing data flow in data transmission system and, more particularly, to a method and system for increasing the overall throughput of the data transmission system by eliminating transmission deadlock cases and by providing improved low latency support.

BACKGROUND OF THE INVENTION

Serial-link I/O interconnect protocols, such as PCI-Express, are utilized in computing and communication platforms to interconnect components of the platforms to enable efficient I/O transfers between the components. The PCI Express protocol has a clear defined traffic flow concept. The core of the traffic flow concept is the use of buffers and credits. Buffers are available in order to better manage sending and receiving data through the PCI Express Link. Credits, on the other hand, are control flow units that define how much data can be received by the opposite side of the PCI Express Link.

FIG. 1 is a schematic diagram of a common PCI Express Link. The PCI Express Link is dual simplex, meaning that each module has a transmit side (TX) and a receive side (RX) side running independently. As shown in the figure, the TX side of Module 1 is the RX side of Module 2.

Each module contains an RX side buffer that is able to accept the incoming stream of data from the opposite TX side. Each module also contains a TX side buffer that is able to send the right data transfer type (Posted, Non-posted, or Completion) over the PCI-Express Link. The RX and TX buffers are required for the improved performance of the PCI Express Link as well as the speed matching between the protocol's core frequency and the chip's system clock frequency.

In operation, each application (module) advertises to the opposite side how much data it can receive. Available credits are advertised per transaction type. PCI Express distinguishes between 6 credit types: posted data credits, posted header credits, non-posted data credits, non-posted header credits, completion data credits and completion header credits. The PCI-Express credit scheme is well explained in the PCI Express Base Specification 1.0a, which is incorporated herein by reference. As described in the Specification, separate credit types are required for each of the transaction types to avoid potential data deadlocks in the transmission of the different transaction types across the PCI-Express link.

FIG. 2 is a more detailed schematic diagram of Module 1 of the common PCI Express Link of FIG. 1. An application 102 typically has multiple internal clients (Client 1, Client2, ... ) that communicate with other modules (not shown) over the PCI Express link 104 through the PCI-Express core 106. Generally, a communication of data is transmitted from a client to the application arbiter 110, which, based on an arbitration protocol, prioritizes the communications and transmits them to the synchronization buffer 112. Each client typically includes a buffer to optimize the data flow in the case the application arbiter 110 is busy. The synchronization buffer 112 serves as clock boundary crossing device, since the clock (not shown) of the PCI Express core 106 typically runs much faster than the application internal clock. Therefore, the normal flow of the application data starts with a client sending data from its internal buffer through the application arbiter 110 to the synchronization buffer 112. Synchronization buffer 112 data is then transferred to the PCI Express core 106 through the application interface 108. The application interface 108 is the single link between the application 102 and the PCI Express core 106.

The PCI Express core 106 is responsible for propagating the data from the application 102 through the PCI Express link 104 TX interface 134 to its peer (not shown) on the opposite side of the PCI Express link 104. Under the rules and regulations of the PCI Express Protocol, the PCI-Express core 106 is allowed to send the data only if the peer indicates that it has a sufficient number of credits available for that particular transfer. For example, if the PCI Express core 106 wants to send a memory write transaction through the link 104, it has to make sure that there are enough posted header credits and posted data credits available for that particular transfer. A sufficient availability of those credits basically means that the opposite side of the PCI Express link 104 provided enough storage for receiving and safely preserving the incoming packet. On the other hand, not enough credits means that the PCI Express core 106 is not allowed to send the packet as it might cause a hazard at the opposite side. The packet acceptance in that case is most unlikely and it will cause an error condition by the receiver of the packet.

It is very common for a client to send a transfer for which the PCI Express core 106 does not have enough credits to effectuate the transfer. However, the PCI Express core 106 might have enough credits to enable a data transfer for the next client using different set (type) of credits. In that case, the PCI Express core 106 would not be able to accept the first packet from the first client nor the second packet from the second client. The first packet would be "stuck" on the application interface 108 until enough credits are available to enable the PCI Express core 106 to accept the data transfer from the first client. The second application's packet would also have to be stalled as it cannot propagate through the application interface 108 before the first packet is gone. This packet-after-packet lock situation might cause a system deadlock as the opposite side of the PCI Express link 104 could be expecting the second packet in order to free up credits for the first packet. The first packet, on the other hand, cannot go though as it does not have enough credits. This is a deadlock case.

The PCI Express standard addresses the deadlock issue by providing reordering rules. In order to be able to implement the reordering rules the PCI Express core 106 implements 6 FIFO buffers i.e. posted data buffer 114a, posted header buffer 114b, non-posted data buffer 116a, non-posted header buffer 116b, completion data buffer 118a and completion header buffer 118b. This enables the PCI Express core 106 to handle a large number of transactions from the application 102 without having to stall the application interface 108.

While this type of PCI Express architecture is common, it requires very large PCI Express core buffers 114-118. Without very large buffers 114-118, the deadlock case threat still exists. For example, if one of the PCI Express core buffers 114-118 becomes full such that no other transactions of that type can pass, the application interface will become stalled.

In addition to the memory consumption disadvantage there is a disadvantage dealing with expedited packet handling. If, for example, one of the application clients is latency sensitive and its packets need to be handled quickly, it will not receive the required attention through the PCI Express core 106 even if the application 102 could use a synchronization buffer bypass mode in order to quickly transmit its packets to the application interface 108. The packets to be expedited at the application level will be stacked into one of the PCI Express FIFOs, depending on the packet type. It will be transferred only when all of the previous packets of the same type are transferred to the opposite side of the link 104. Consequently, if the PCI Express FIFO buffers 114-118 are very large in order to minimize the deadlock case threat described above, the latency delay for the low latency packets is increased.

SUMMARY OF THE INVENTION

The present invention is directed to a data flow management system and method in which the application and its clients are made aware of the available credits for each type of transfer before the transfer is attempted. This enables the clients to transmit packets only when the RX side has issued a sufficient number of credits to insure that the transmission will not be stalled. The invention eliminates the need for FIFO buffers in the PCI-Express core, since the application will not transmit packets to the core until the required number of credits for the particular transfer type is available. Therefore, packet transmissions do not require buffering in the core, as they are only sent when they can be sent all the way through the core to the link. This invention also introduces a reliable mechanism for an efficient transfer of low latency packets through the entire PCI-Express architecture.

BRIEF DESCRIPTION OF THE DRAWINGS

These and other features of the invention will become more readily apparent from the following detailed description when read together with the accompanying drawings, in which.

DETAILED DESCRIPTION

Figure 1:
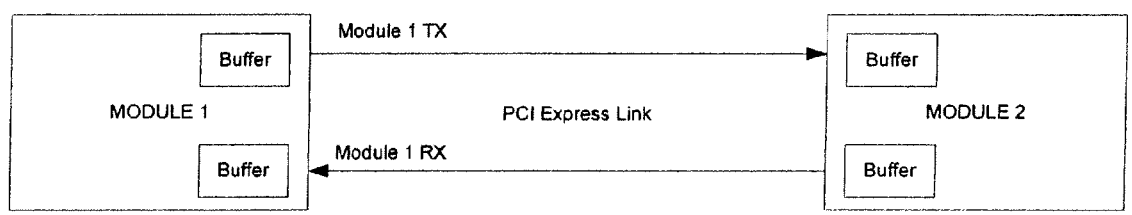
FIG. 1 is a schematic diagram of a prior art data transmission system.
Figure 2:
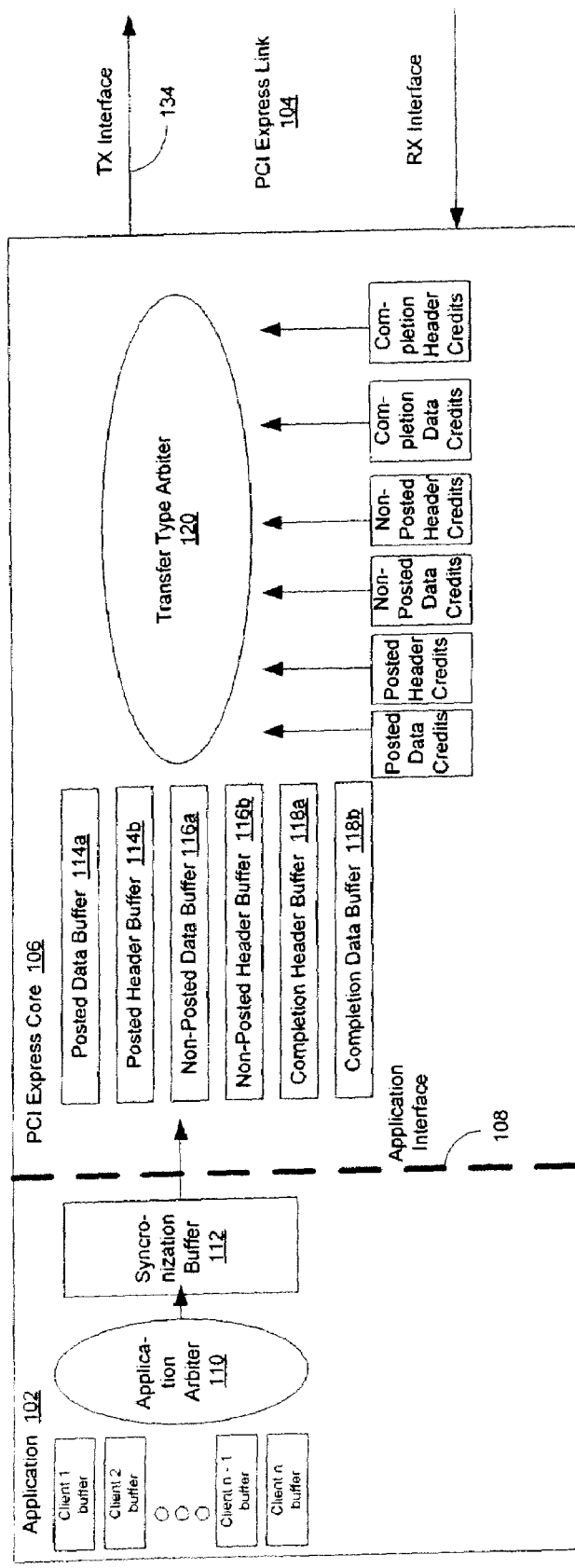
FIG. 2 is a more detailed schematic diagram of the prior art data transmission system of FIG. 1.
Figure 3:
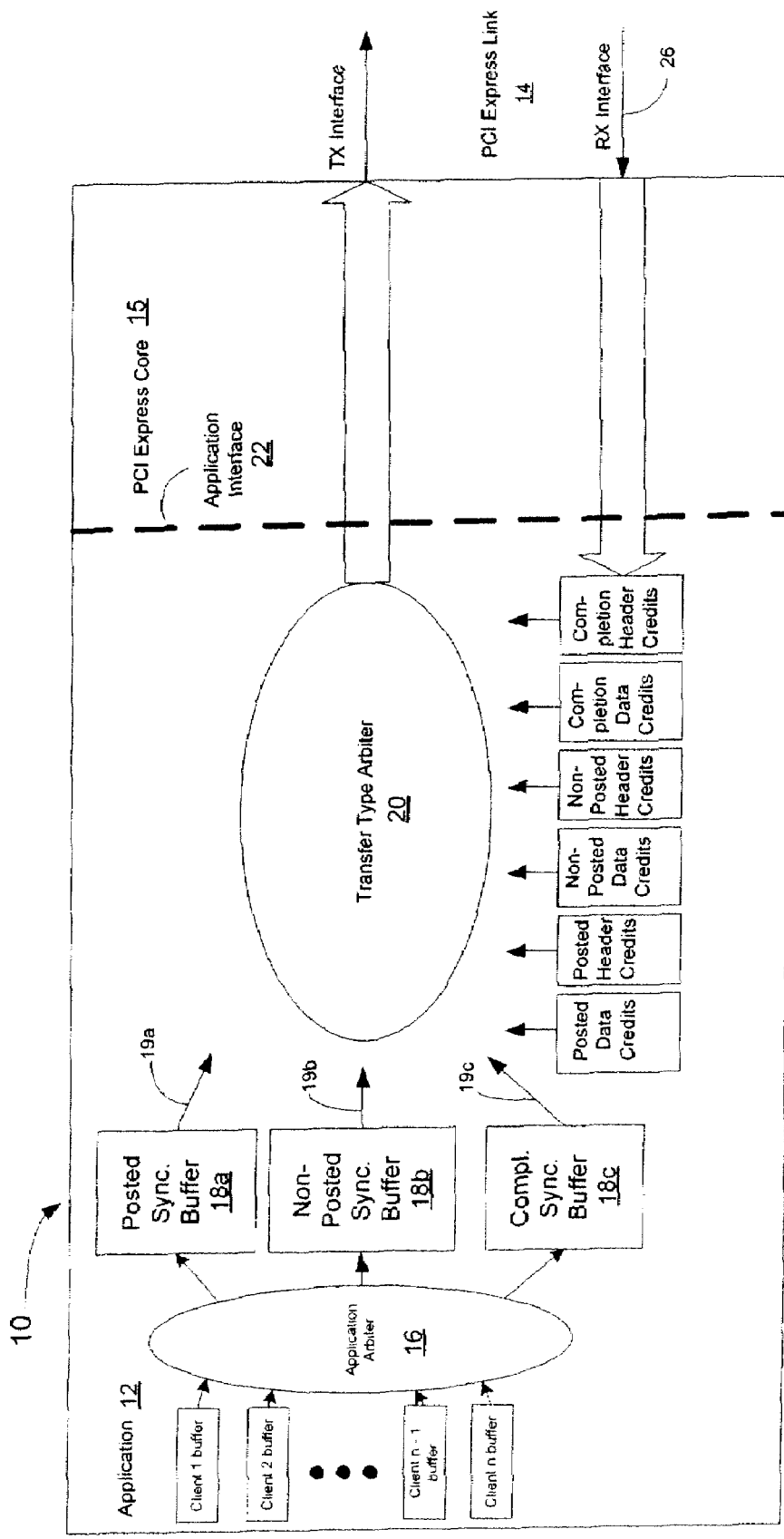
FIG. 3 is a schematic diagram of the data transmission system according to the present invention.

FIG. 3 is a schematic diagram of a data transmission system 10 according to the present invention. Data transmission system 10 includes an application 12 having a number of client buffers 1-n. The application 12 effects the transmission of packets from each of the client buffers to the PCI Express link 14 through the PCI Express core 15. As shown in FIG. 3 and described in detail below, the synchronization buffer has been split into three different buffers, one for each transfer type: posted, non-posted and completion. As is known in the art, posted transfers correspond to writes to memory, non-posted transfers correspond to reads from memory and completion transfers correspond to memory read responses. Also, the data buffers in the PCI-Express core have been eliminated and the transfer type arbiter has been moved from the core to the application 12. The application interface 22 is the single link between the application 12 and the PCI Express core 15.

The data transmission system 10 solves the deadlock hazard problem of the prior art by incorporating the three separate synchronization buffers 18a, 18b and 18c and three corresponding separate buffer data paths 19a, 19b and 19c. Synchronization buffer 18a and buffer data path 19a are dedicated for transferring posted transfers; synchronization buffer 18b and buffer data path 19b are dedicated for transferring non-posted transfers; and synchronization buffer 18c and buffer data path 19c are dedicated for transferring completion transfers. This enables the application arbiter 16 to sort the transfers from each of the clients into the appropriate synchronization buffer 18a-18c and for each type of transfer to be delivered to the transfer type arbiter 20 to the PCI Express core 15 over a separate associated buffer data path 19a-19c. There, since each type of transfer is buffered and transmitted only with like transfer types, no transfer types will be deadlocked by the inability of the system 10 to transmit transfers of a different type.

By incorporating the transfer type arbiter 20 into the application 12 rather than in the PCI Express core 15, the application 12 is able to coordinate the transmission of data transfers based on the credits available for each of the transfer types. As described above, the RX side of the core 15 delivers credits received from the module (not shown) on the opposite side of the PCI Express link 14 to the TX side of the core 15 to indicate the amount of memory that it has to receive each of the different transfer types from the application 12. In one embodiment, each credit allows the transfer of one data packet to the opposite-side module. In the prior art system, these credits were only "visible" to the core, which caused the application to blindly transmit data transfers to the core that, based on the number of available credits, the opposite-side module was not able to receive. Based on the availability of credits, the core would have to hold the transfers until the opposite-side module issued credits for that particular transfer type.

In the data transmission system 10, since the transfer type arbiter 20 is incorporated into the application 12, the credits issued to the TX side from the RX side are visible to the application 12 and therefore, the application is able to determine which transfer types are able to be received by the RX side and then transmit the number of those types based on the number of credits available.

Figure 4:
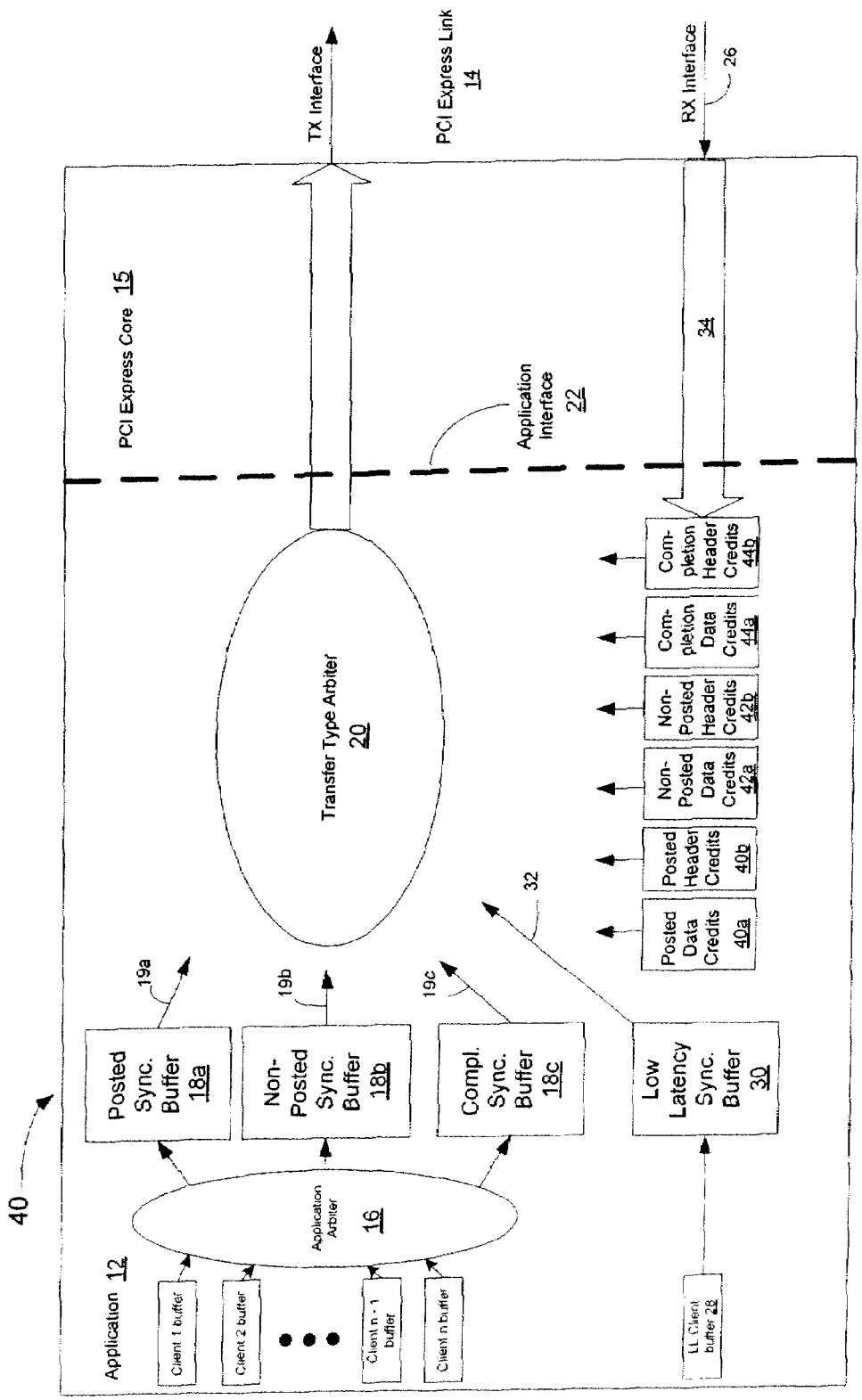
FIG. 4 is a schematic diagram of another embodiment of the data transmission system according to the present invention.

FIG. 4 is a schematic diagram of another embodiment 40 of the data transmission system of the invention. In addition to the components of data transmission system 10, data transmission system 40 also includes a low-latency client buffer 28, a low latency synchronization buffer 30 and a low latency buffer data path 32. Packets that must be expedited through the data transmission system 40 by the application are transferred from the low latency buffer 28 directly to the low latency synchronization buffer 30 while bypassing the application arbiter 16. The low latency packets in the low latency synchronization buffer 30 are prioritized by the transfer type arbiter and are therefore transferred to the PCI Express core 15 by the transfer type arbiter 20 before any of the packets in synchronization buffers 18a-18c, provided, of course, that there are credits available for the type of transfer embodied by the low latency packets. Alternatively, under certain protocols, the low latency packet may be transferred directly from the low latency buffer 28 to the transfer type arbiter 20, bypassing the low latency synchronization buffer 30. For example, the low latency synchronization buffer 30 may be bypassed during the transfer of a WAIT signal to the opposite-side module, since the WAIT signal must be received and acted upon by the opposite-side module as quickly as possible.

Accordingly, under the prior art PCI Express protocol, data packets are held in data packet-type buffers in the PCI Express core until adequate numbers of credits are received in the core to enable the core to transfer the data packets across the PCI Express link. If the application sends data packet transfers to the core, and the core does not have sufficient credits to complete the transfer for that packet type (posted, non-posted or completion), the data packet transfers will remain in the data packet-type buffer until the correct number and type of credits are received. In the meantime, since the application is not aware of the number and type of credits that are available to the core, it could send further data packet transfers of the same type, which will also be held in the data packet-type buffers. In order to eliminate the deadlock case, where data packet transfers of one type are not held up because of an inability of the core to transfer packets of another type, the PCI Express protocol calls for the use of the different data packet-type buffers, as described above. However, these buffers require large memories. Furthermore, the possibility of a deadlock still exists if one of the buffers becomes full and stalls the single application interface. The prior art PCI Express protocol also has no means to handle low latency packets which must be transferred through the core on a priority basis.

As described above, the present invention eliminates these shortcomings by providing a synchronization buffer for each of the packet types, as well as for low-latency packets, by providing an interface for each of the synchronization buffers to the transfer type arbiter and by moving the transfer type arbiter from the core to the application. The present invention eliminates the need for a large buffer for each data packet type, thus greatly reducing the memory requirements of the system, eliminates the deadlock case by providing a synchronization buffer for each transfer type and, by moving the transfer type arbiter from the core to the application, enables the application to determine which types of packets should be transferred to the core based on the number and type of available credits.

According to the credit management process of the invention, the application 12 receives credits over credit buses 40*a*, 40*b*, 42*a*, 42*b*, 44*a* and 44*b* through the separate interface 34 going from the RX interface 26, through the PCI Express core 15 to the application 12. As described above, in this configuration, the number of available credits per transfer type is visible to the application 12, thereby enabling the application to select the type and number of packets that it is able to transmit.

The credit management protocol between the PCI Express Core and the application efficiently delivers a valid number of credits to the application 12. Credits are still managed inside the transaction layer of the PCI Express core 15 according to the PCI Express protocol, however, in data transmission systems 10 and 40, they are made visible to the application 12.

Figure 5:
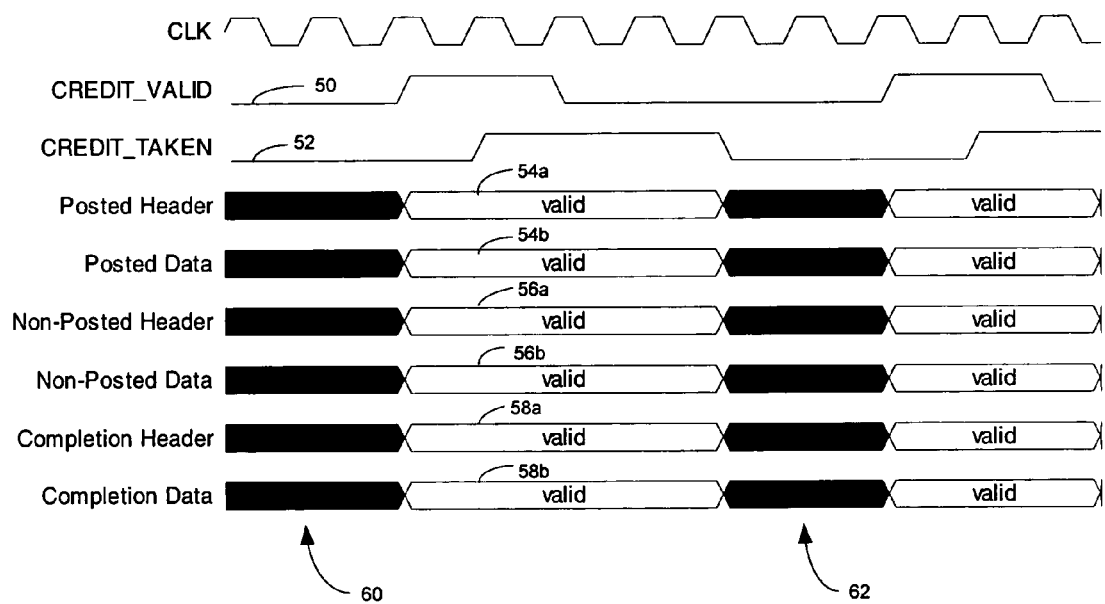
FIG. 5 is a waveform diagram showing signals transmitted between the transmitter and receiver in the data transmission system of FIGS. 3 and 4 according to the present invention.

FIG. 5 is a waveform diagram showing the states of credits and control signals utilized in the credit management protocol of the invention. The CREDIT_VALID signal 50 is asserted by the PCI Express core 15 when the credits on the six credit buses 40-44 are valid. The CREDIT_TAKEN signal 52 is asserted by the application 12 when it is taking credits from the credit buses 40-44 and transmitting packets to the link 14. Signals 54*a*, 54*b*, 56*a*, 56*b*, 58*a*, and 58*b* show the status of each of the posted header credit bus 40*a*, posted data credit bus 40*b*, non-posted header credit bus 42*a*, non-posted data credit bus 42*b*, completion header bus 44*a* and completion data bus 44*b*, respectively. When each signal is indicated as 'valid' in the figure, the associated credit bus has credits which may be taken by the application 12 to transmit transfers to the link 14.

When the PCI Express core 15 determines that credits received therein from the RX side are valid, it asserts the CREDIT_VALID signal 50. This signal indicates to the application 12 that credits are available for transmitting transfers to the link 14. When the application 12 begins a packet transmission it asserts the CREDIT_TAKEN signal 52 and begins transmitting packets. The asserted CREDIT_TAKEN signal 52 indicates to the PCI Express core 15 that the application is currently taking credits and therefore prevents the PCI Express core 12 from updating the credits or decrementing the credits for its own internal purposes. During periods 60 and 62, when both the CREDIT_VALID signal 50 and the CREDIT_TAKEN signal 52 are deasserted, the PCI-Express core is able to update or decrement the credits as necessary.

Credits on the buses might not be valid in the case where the PCI Express core 12 just received a packet from the application 12 and it needs some time to update the credits on the associated buses. The same credit buses might also be invalid if a credit management packet (DLLP) was just received by the RX side of the link 14. In that case, the PCI Express core 15 might need time to update credit buses 40-44 to the most up-to-date credit status received. The PCI Express core 15 might also keep the credits invisible to the application, by keeping the CREDIT_VALID signal deasserted, when it needs to send its own message or any other maintenance packet that consumes a certain number of credits. If, however, CREDIT_TAKEN is already asserted, the application has a full right of packet transfer and the PCI Express core must wait for its own packet transmission.

This credit management protocol also allows back-to-back transfers. This means that once CREDIT_TAKEN is asserted the application 12 can send multiple transfers back-to-back without having to deassert the CREDIT_TAKEN signal 52, and therefore releasing the credits. As set forth above, the PCI Express core 15 cannot change the number of credits until the CREDIT_TAKEN signal 52 is deasserted. This enables the application 12 to arrange the transfers in certain order much earlier and much more efficiently.

Figure 6:
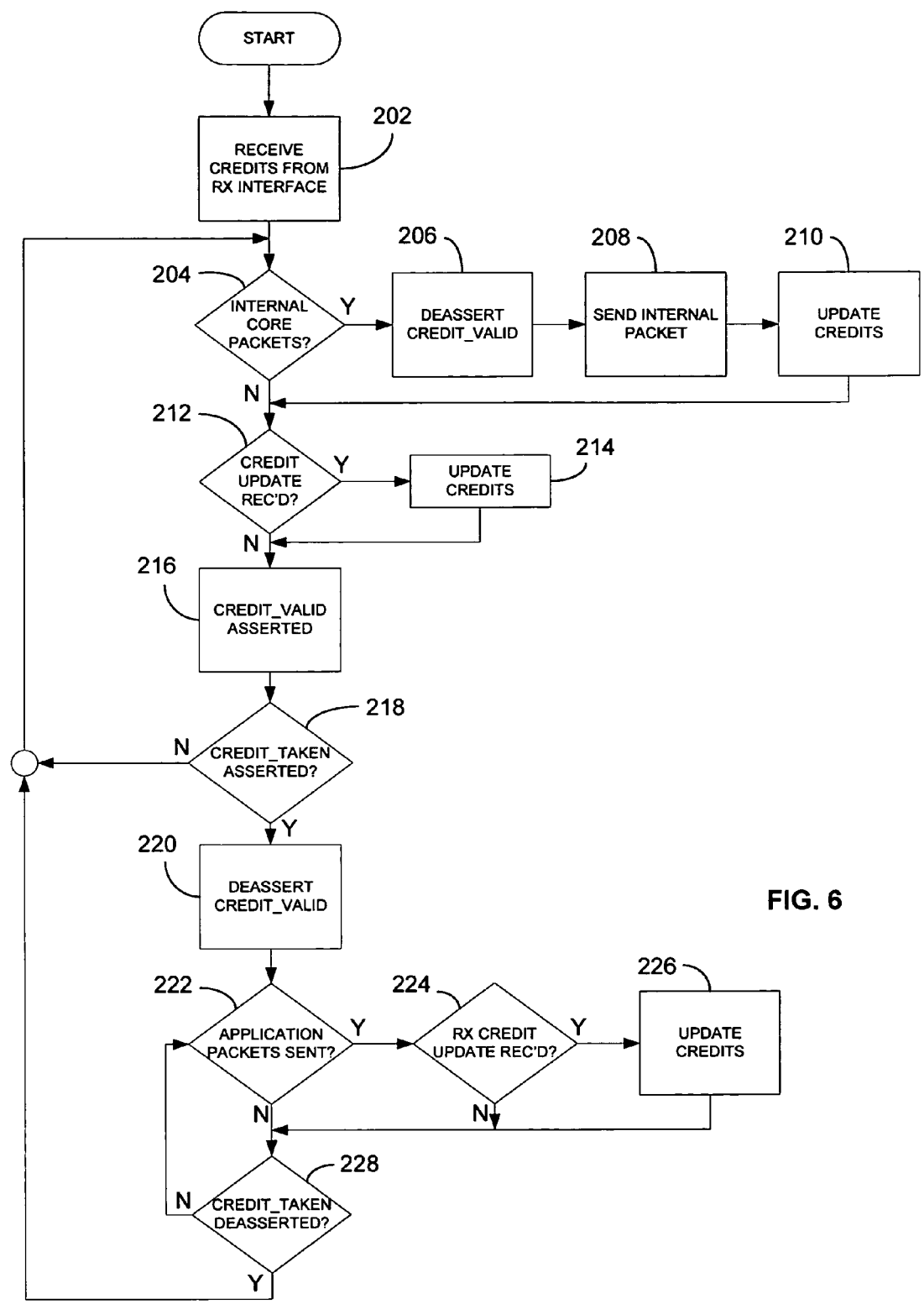
FIG. 6 is a flow diagram showing the credit management process carried out in the present invention from the point of view of the core.

The credit management process of the present invention will be described with reference to FIG. 6, which is a flow diagram showing the process as seen from the point of view of the core 15, and FIG. 7, which is a flow diagram showing the process as seen from the point of view of the application 12. In Step 202, the core 15 receives credits from the RX interface. These credits are stored in an internal register within the core. Step 202 continuously takes place when the core is operational. However, the credits received are only updated according to the processes shown in FIG. 6. In Step 204, the core determines whether the credits received are its own internal status credit packets or if the credits received are credits that will be used to update the credits on credit busses 40-44 and made available to the application for data transfers. If the credit received is an internal status packet, the core will deassert the CREDIT_VALID signal 50, Step 206, will send the internal packet to its destination within the core 15, Step 208 and will update the credits on the credit busses 40-44, if necessary, Step 210.

If, in Step 204, the core did not receive internal packets, or the internal packets were received and processed according to Steps 206-210, the process proceeds to Step 212, where the core determines whether it has received a credit update from the RX interface. If it has, the core transfers each of the credits from its internal register to the appropriate credit bus 40-44 to update the credits available to the application for transferring data packets, Step 214. At this point, whether the core has received a credit update or not, it will assert the CREDIT_VALID signal 50 to inform the application that the credits on the busses 40-44 are available for use in transferring data packets, Step 216.

If, in Step 218, the CREDIT_TAKEN signal 52, FIG. 5, has not yet been asserted, the process returns to Step 204 and the core 15 determines the status of any received credits in Steps 204 and 212. If, in Step 218, the core determines that the CREDIT_TAKEN signal 52 has been asserted by the application, indicating that the application has begun transferring data packets and consuming credits, the core 15 deasserts the CREDIT_VALID signal 50, Step 220 since, in the steps that follow, the credit packet count updated in Step 214 will no longer be valid. The core then monitors whether data packets are being transferred by the application to the PCI Express link 14, Step 222 and monitors whether credit updates have been received from the RX interface, Step 224. If the application is transferring data packets and consuming credits, Step 222, in Step 226, the core updates the available credits by decrementing the credits as each packet is sent by the application. If the core has received credits from the RX interface, Step 224 in Step 226, the core updates the available credits by incrementing the credits as each new credit packet is sent from the RX interface. While, in Step 226, the credits are updated, they will not be available to the application until the CREDIT_VALID signal 50 is again asserted by the core in Step 216. In other words, when the application asserts the CREDIT_TAKEN signal 52, it only has the number of credits that were available at the time the CREDIT_TAKEN signal is asserted. However, as is described below, the application is able to 'see' the credit amounts that are being updated during this process.

As long as the CREDIT_TAKEN signal 52 is not deasserted by the application, Step 228, the core continues to monitor the packet transfers and credits received in Steps 222-226, as described above. When the application does deassert the CREDIT_TAKEN signal 52, either because it is finished transferring packets or because it has consumed all of the available credits, the process returns to Step 204 and continues as described above.

Figure 7:
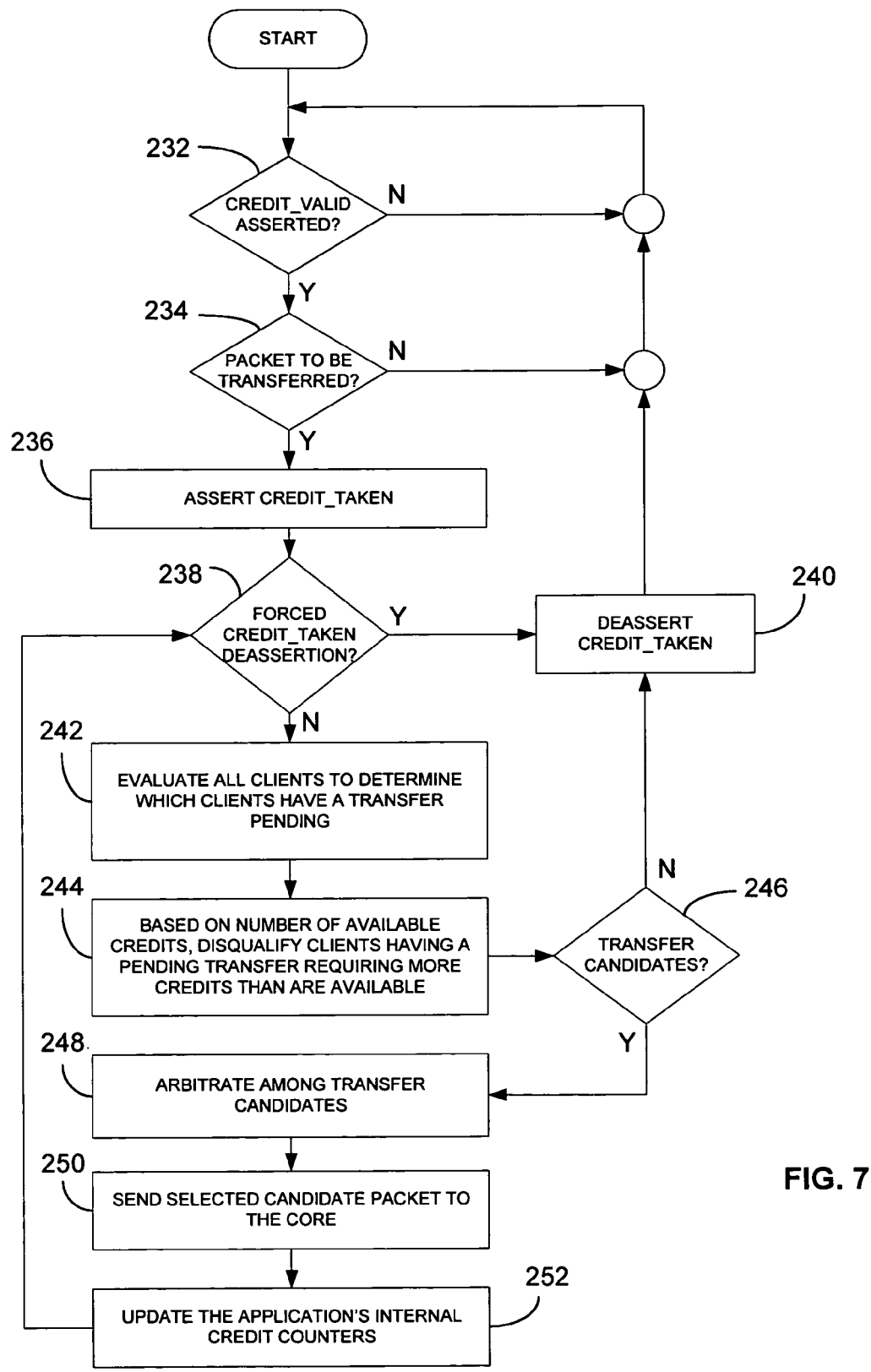
FIG. 7 is a flow diagram showing the credit management process carried out in the present invention from the point of view of the application.

Referring now to FIG. 7, in Step 232, the application monitors the CREDIT_VALID signal 50 to determine when it can begin transferring data packets as described above. When the CREDIT_VALID signal 50 is asserted in Step 232, the application 12 determines whether it has any data packets that are ready to be transferred to the PCI Express link 14, Step 234. If not, the process loops to Step 232. If, in Step 234, the application has data packets that are ready to be transferred, the application asserts the CREDIT_TAKEN signal 52, Step 236.

In Step 238, the application determines whether to force a deassertion of the CREDIT_TAKEN signal 52. A forced deassertion of the CREDIT_TAKEN signal 52 could occur under different circumstances. In one instance, since the application 12 takes ownership of a fixed number of credits when the CREDIT_TAKEN signal is first asserted, as data transfers are carried out, the number of available credits decreases with each transfer. If the number of available credits drops to zero or below a predetermined threshold number, the application will need more credits to complete its data transfers. For example, in one embodiment of the invention, each data credit enables the application to transfer 16 bytes of data and each header credit enables the application to transfer one header. The maximum data transfer size in an embodiment of the invention is 256 bytes, although any size transfer may be contemplated in the system. Therefore, 16 credits would be needed to complete a transfer of a 256 bytes transfer. Accordingly, if the number of available credits dropped below 16, the application could force the deassertion of the CREDIT_TAKEN signal 52 in Step 238. The deassertion of the CREDIT_TAKEN signal 52 in Step 238 coincides with Step 228 of FIG. 6, in which the core determines that the CREDIT_TAKEN signal 52 has been deasserted and then proceeds to update the available credits in Step 214. If the application forces deassertion of the CREDIT_TAKEN signal 52 in Step 238, the CREDIT_TAKEN signal 52 is deasserted, Step 240, and the process returns to Step 232, where the application waits for the core to assert the CREDIT_VALID signal 50 in Step 216, FIG. 6. When the CREDIT_VALID signal 50 is asserted by the core, the number of credits that are available to the application will have been updated by the core.

If, in Step 238, the application does not force the deassertion of the CREDIT_TAKEN signal 52, the process continues to Step 242, where the application evaluates each of its clients to determine which clients have a transfer pending. Based on the number and type of available credits, the application then disqualifies any clients having a pending transfer requiring more credits than are available for the particular type of transfer, Step 244. After disqualifying clients, the application determines whether there are any remaining clients that have transfers that are candidates for being processed, Step 246. If not, the CREDIT_TAKEN signal 52 is deasserted, Step 240, and the process returns to Step 232.

If there are transfer candidates remaining in Step 246, the application transfer type arbiter 20 arbitrates between the pending transfers to determine the order in which the transfers will be processed, Step 248. In one embodiment of the invention, particular clients are given priority over other clients. For example, the low-latency client buffer is always given priority over all other clients. The system could be configured to have clients at differing tiers of priority with respect to one another. Also, the arbitration could be based on the types of pending transfers. For example, posted transfers could be favored over non-posted transfers, which could be favored over completions.

Once the transfers have been prioritized, the selected transfers are sent to the core by the transfer type arbiter 20, Step 250. The application updates its internal credit counter to decrement the number of credits used in the previous transfer, Step 252, and the process returns to Step 238, where the application determines whether a forced deassertion of the CREDIT_TAKEN signal 52 is needed.

Accordingly, the credit management protocol provides efficient delivery of the valid credits per transfer type through the credit buses, which gives the application 12 more visibility and more ability to prevent deadlock cases and to expedite traffic through the system. Furthermore, efficient back-to-back transfer support enabled by this protocol increases the overall throughput and efficiency of the system as transfers through the application interface 22 have fewer gaps therebetween, because the credit management protocol with its back-to-back feature reduces the idle times between packets traversing the application interface. An enhanced Quality of Service feature is also introduced by creating an environment where the low-latency packets can receive a highest attention and the lowest transmission wait time.

The system and method described herein may find applicability in any computing or processing environment. The system and method may be implemented in hardware, software, or a combination of the two. For example, the system and method may be implemented using circuitry, such as one or more of programmable logic (e.g., an ASIC), logic gates, a processor, and a memory.

The system and method may be implemented in computer programs executing on programmable computers that each includes a processor and a storage medium readable by the processor (including volatile and non-volatile memory and/or storage elements). Each such program may be implemented in a high-level procedural or object-oriented programming language to communicate with a computer system and method. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform the functions of the data framer interface. The system and method also may be implemented as a machine-readable storage medium, configured with a computer program, where, upon execution, instructions in the computer program cause a machine to operate to perform the functions of the system and method described above.

Implementations of the system and method may be used in a variety of applications. Although the system and method is not limited in this respect, the system and method may be implemented with memory devices in microcontrollers, general-purpose microprocessors, digital signal processors (DSPs), reduced instruction-set computing (RISC), and complex instruction-set computing (CISC), among other electronic components.

Implementations of the system and method may also use integrated circuit blocks referred to as main memory, cache memory, or other types of memory that store electronic instructions to be executed by a microprocessor or store data that may be used in arithmetic operations.

The invention may be embodied in other specific forms without departing from the spirit or essential characteristics thereof. For example, while the invention is described as applying to the PCI Express protocol, it will be understood that the inventive concept of described herein may be applied to any data transfer system or protocol in which an increase in the overall throughput and efficiency of the system is desired. The present embodiments are therefore to be considered in all respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A method of managing data packet transfers between modules of a serial-link communication system from an application of a first module through a core of the module to the serial link, the method comprising:
   A. the core receiving data transfer credits at a receive interface of the core of the first module;
   B. the core updating a data transfer credit count within a plurality of data transfer credit buses of the application;
   C. the core asserting a first signal indicating that the data transfer credit count on each of the plurality of data transfer credit buses is valid;
   D. the application asserting a second signal indicating that it is taking control of the data transfer credits on each of the plurality of data transfer credit buses and preventing the core from updating the data transfer credit count on each of the plurality of data transfer credit buses;
   E. the application transferring data packets to the serial link through the core and decrementing the data transfer credit count for one of the plurality of data transfer credit buses for each data packet transferred; and
   F. the application deasserting the second signal to release control over the data transfer credits;
   wherein each data packet transfer is one of a number of different types of data packet transfers; and
   wherein the application forces a deassertion of the second signal if the data transfer credit count for a type of data packet transfer drops below a threshold number.

2. The method of claim 1 wherein, after Step F, the method returns to Step A and continues through Steps A through F.

3. The method of claim 2 wherein Step E further includes:
   E1. the application evaluating internal clients to determine which clients have a data packet transfer pending;
   E2. arbitrating among the clients having data packet transfers pending to determine a priority of carrying out packet transfers; and
   E3. transferring the highest priority data packet to the serial link through the core.

4. The method of claim 3 further including, after Step E1, the application disqualifying clients having a data packet transfer pending which would require more credits than are available for the client's data packet transfer.

5. The method of claim 4 wherein each of the data transfer credits is one of a number of different types of data packet transfers credits, each being associated with one of the different types of data packet transfers.

6. The method of claim 5 wherein the data packet transfers are either posted transfers, non-posted transfers or completions.

7. The method of claim 6 wherein each of the data packet transfers includes a header portion and a data portion.

8. The method of claim 7 wherein each data transfer credit is one of a posted data transfer credit, a posted header transfer credit, a non-posted data transfer credit, a non-posted header transfer credit, a completion data transfer credit and a completion header transfer credit.

9. The method of claim 8 wherein, in Step E, the application decrements the data transfer credit count of the type of data transfer credit associated with the type of data packet that has been transferred.

10. The method of claim 9 wherein the threshold number is one.

11. The method of claim 9 wherein the threshold number is a number that corresponds to the number of credits needed to perform the transfer of a maximum-sized data transfer.

12. A system for managing data packet transfers between modules connected by a serial link comprising:
   a core including a receive interface with the serial link; and
   an application having a plurality of clients from which data packets are transferred to the serial link through the core;
   wherein the core receives data transfer credits at the receive interface of the core of the first module, updates a data transfer credit count within a plurality of data transfer credit buses of the application, and asserts a first signal indicating that the data transfer credit count on each of the plurality of data transfer credit buses is valid; and
   upon the assertion of the first signal by the core, the application asserts a second signal indicating that it is taking control of the data transfer credits on each of the plurality of data transfer credit buses to prevent the core from updating the data transfer credit count on each of the plurality of data transfer credit buses, transfers data packets to the serial link through the core while decrementing the data transfer credit count for one of the plurality of data transfer credit buses for each data packet transferred, and then deasserts the second signal to release control over the data transfer credits;

wherein each data packet transfer is one of a number of different types of data packet transfers; and wherein the application forces a deassertion of the second signal if the data transfer credit count for a type of data packet transfer drops below a threshold number.

13. The system of claim 12 wherein the application evaluates its clients to determine which clients have a data packet transfer pending, arbitrates among the clients having data packet transfers pending to determine a priority of carrying out packet transfers, and transfers the highest priority data packet to the serial link through the core.

14. The system of claim 13 wherein the application disqualifies clients having a data packet transfer pending which would require more credits than are available for the client's data packet transfer.

15. The system of claim 14 wherein each of the data transfer credits is one of a number of different types of data packet transfers credits, each being associated with one of the different types of data packet transfers.

16. The system of claim 15 wherein the data packet transfers are either posted transfers, non-posted transfers or completions.

17. The system of claim 15 wherein each of the data packet transfers includes a header portion and a data portion.

18. The system of claim 17 wherein each data transfer credit is one of a posted data transfer credit, a posted header transfer credit, a non-posted data transfer credit, a non-posted header transfer credit, a completion data transfer credit and a completion header transfer credit.

19. The system of claim 18 wherein the application decrements the data transfer credit count of the type of data transfer credit associated with the type of data packet that has been transferred.

20. The system of claim 19 wherein the threshold number is one.

21. The system of claim 19 wherein the threshold number is a number that corresponds to the number of credits needed to perform the transfer of a maximum-sized data transfer.

* * * * *